United States Patent
Takahashi et al.

(10) Patent No.: US 9,312,709 B2
(45) Date of Patent: Apr. 12, 2016

(54) CHARGING STAND

(71) Applicant: SONY CORPORATION, Minato-ku (JP)

(72) Inventors: Tsutomu Takahashi, Tokyo (JP); Taro Takamoto, Tokyo (JP); Koichi Izawa, Tokyo (JP); Shintaro Nonaka, Tokyo (JP); Tamio Nishino, Saitama (JP)

(73) Assignee: Sony Corporation, Tokyo (JP)

( * ) Notice: Subject to any disclaimer, the term of this patent is extended or adjusted under 35 U.S.C. 154(b) by 103 days.

(21) Appl. No.: 13/925,207

(22) Filed: Jun. 24, 2013

(65) Prior Publication Data
US 2014/0375248 A1   Dec. 25, 2014

(51) Int. Cl.
*H02J 7/00* (2006.01)
*H04M 1/04* (2006.01)

(52) U.S. Cl.
CPC .............. *H02J 7/0044* (2013.01); *H04M 1/04* (2013.01); *Y10T 29/49169* (2015.01)

(58) Field of Classification Search
CPC ..... H01R 13/60; H01R 13/6205; H04M 1/11; H02J 7/00
USPC ............... 320/107, 108; 455/575.1; 335/219; 439/39
See application file for complete search history.

(56) References Cited

U.S. PATENT DOCUMENTS

| | | | |
|---|---|---|---|
| 8,164,222 B2 | 4/2012 | Baarman | |
| 8,648,679 B2 * | 2/2014 | Lauder et al. | 335/219 |
| 8,690,582 B2 * | 4/2014 | Rohrbach et al. | 439/39 |
| 2013/0184037 A1 * | 7/2013 | Hopkins | 455/575.1 |
| 2013/0323941 A1 * | 12/2013 | Zeliff et al. | 439/39 |
| 2014/0139178 A1 * | 5/2014 | Large et al. | 320/108 |

* cited by examiner

*Primary Examiner* — Richard Isla Rodas
*Assistant Examiner* — Dung V Bui
(74) *Attorney, Agent, or Firm* — Oblon, McClelland, Maier & Neustadt, L.L.P.

(57) ABSTRACT

An apparatus includes a main body having an opening and a movable member configured to hold a plug capable of transmitting an electrical current to an external device. At least one of the movable member and the plug include a magnet. The movable member and the plug are arranged such that at least one connector of the plug extends beyond a plane parallel to the opening when the movable member is in a first state, the first state corresponding to a magnetic force between a ferromagnetic material and the magnet above a predetermined magnitude. The movable member transitions from the first state to a second state when the magnetic force is below the predetermined magnitude. When the movable member is in the second state, the at least one connector of the plug remains below the plane parallel to the opening.

20 Claims, 9 Drawing Sheets

CHARGING STAND

BACKGROUND

1. Technical Field

The present disclosure relates to a method and apparatus for supplying an electrical charge to an external device.

2. Description of Related Art

Charging stands for supplying a charge to a mobile device such as a smartphone or tablet are conventionally manufactured for exclusive use with a particular mobile device. For example, conventional charging stands may only permit a mobile device of a particular size to fit onto the stand. Additionally, conventional charging stands may require the mobile device be mounted in the stand according to a specific arrangement position or orientation.

Additionally, conventional charging stands frequently include a charging terminal that projects outward from the charging stand base. Consequently, the surface of the mobile device may be damaged (e.g., scratched) when the user attempts to align the mobile device's charging terminal with the charging stand's charging terminal.

SUMMARY

In one embodiment of the present disclosure, a charging apparatus includes a main body having an opening and a movable member configured to hold a plug capable of transmitting an electrical current to an external device. At least one of the movable member and the plug may include a magnet. The movable member and the plug may be arranged such that at least one connector of the plug extends beyond a plane parallel to the opening when the movable member is in a first state, the first state corresponding to a magnetic force between a ferromagnetic material and the magnet above a predetermined magnitude. The movable member may transition from the first state to a second state when the magnetic force is below the predetermined magnitude. When the movable member is in the second state, the at least one connector of the plug remains below the plane parallel to the opening.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
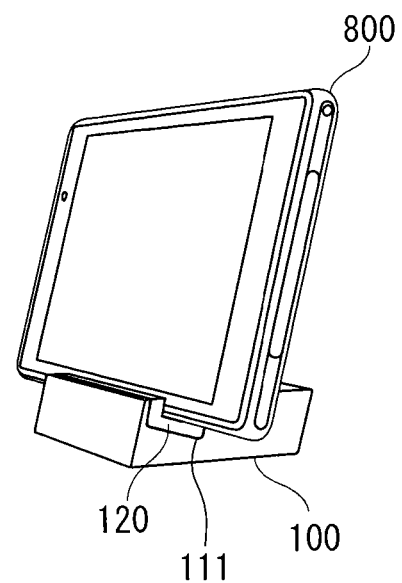
FIGS. 1A and 1B illustrate mobile devices on an exemplary charging stand according to one aspect of the present disclosure.

Referring now to the drawings, wherein like reference numerals designate identical or corresponding parts throughout the several views.

Figure 1B:
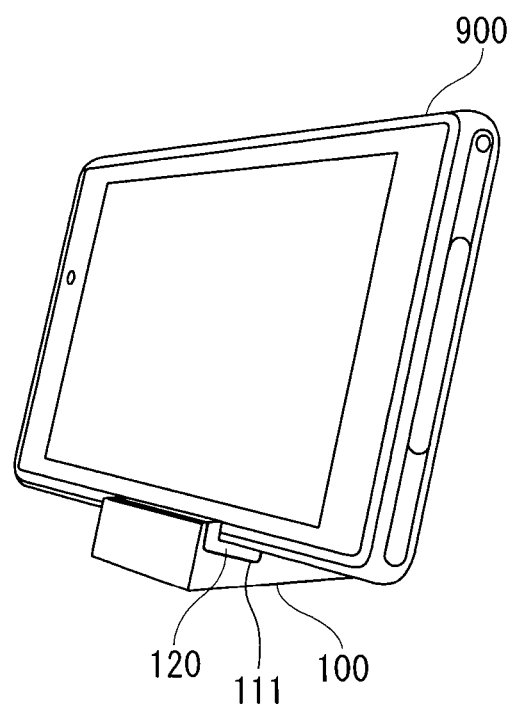

FIGS. 1A and 1B illustrate non-limiting examples of mobile devices in an exemplary charging stand 100. Referring first to FIG. 1A, a mobile device 800 of relatively small size (e.g., a smartphone) is shown mounted in a terminal holding member 120. In this example, the terminal holding member 120 has a corresponding shape and is mounted within a groove 111 that is included in the charging stand 100. The arrangement of the mobile device 800 and the charging stand 100 in FIG. 1A may correspond to a condition in which the mobile device 800 is being charged. For example, the mobile device 800 may include a charging terminal on its periphery (e.g., on one of its sides), and a corresponding charging terminal plug may be included within the groove 111 and/or the terminal holding member 120 such that an electrical charging current is passed from the charging stand's charging plug to the mobile device 800, thereby charging the mobile device 800's battery.

In certain aspects of the present disclosure, the terminal holding member 120 may have an internal width corresponding to a thickness of the mobile device 800 such that the mobile device 800 is securely sandwiched between the walls of the terminal holding member 120 when the mobile device 800 is being charged. In other aspects of the present disclosure, the terminal holding member 120 may be detachable such that other terminal holding members of varied internal widths may be mounted in the groove 111. For example, a plurality of detachable terminal holding members having internal widths corresponding to other mobile devices of different thicknesses may be included with the charging stand 100 such that the other mobile devices may be charged within the charging stand, which provides the advantage of commonality when using the charging stand 100 to charge a plurality of mobile devices.

As an alternative to providing a plurality of holding members, the internal width of the terminal holding member 120 may be variable. That is, a single terminal holding member may be provided with the charging stand 100, and the internal width of the terminal holding member may be changed, e.g., by moving the holding member's walls. In addition to providing commonality across mobile devices, varied holding member internal width provides the advantage of easily accommodating mobile devices with aftermarket protective coverings, which may increase the thickness of the mobile device.

For the purposes of the present disclosure, it is preferred that a holding member such as the terminal holding member 120 is provided such that multiple different types of devices may be charged in the charging stand 100; however, it should be appreciated that the mobile device 800 may be charged by engaging the mobile device 800 directly within the groove 111, and the inclusion of the terminal holding member 120 is neither limiting nor required.

Referring now to FIG. 1B, FIG. 1B illustrates a non-limiting example in which a mobile device 900 is being charged in the charging stand 100. The mobile device 900 is of a larger size than the mobile device 800 shown in FIG. 1A. For example, the mobile device 900 may be a tablet computing device. As shown in this exemplary charging stand structure, in addition to providing terminal holding members of varied internal widths, the charging stand 100 may, in certain embodiments, be open-ended at the groove 111 and/or the terminal holding member 120 such that mobile devices of varied dimensions (e.g., lengths and widths) may be charged on the charging stand 100.

Figure 2:
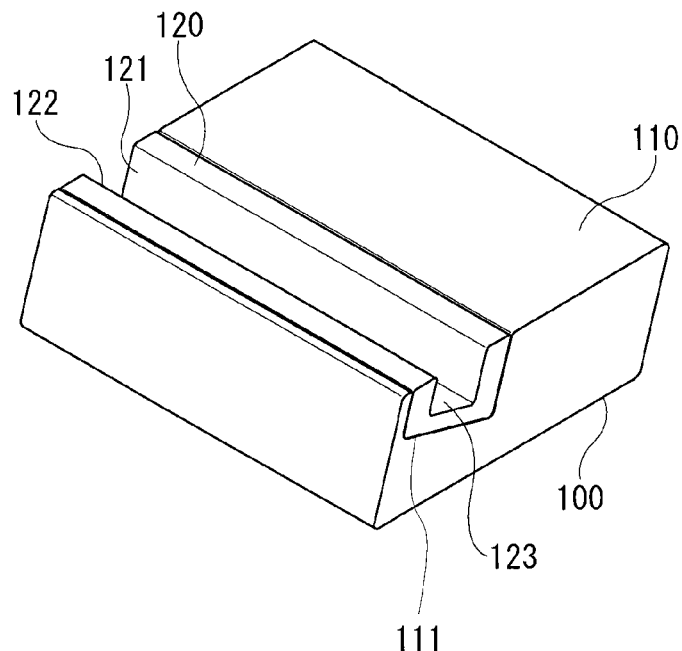
FIG. 2 illustrates an exemplary structure of a charging stand according to one aspect of the present disclosure.
Figure 3:
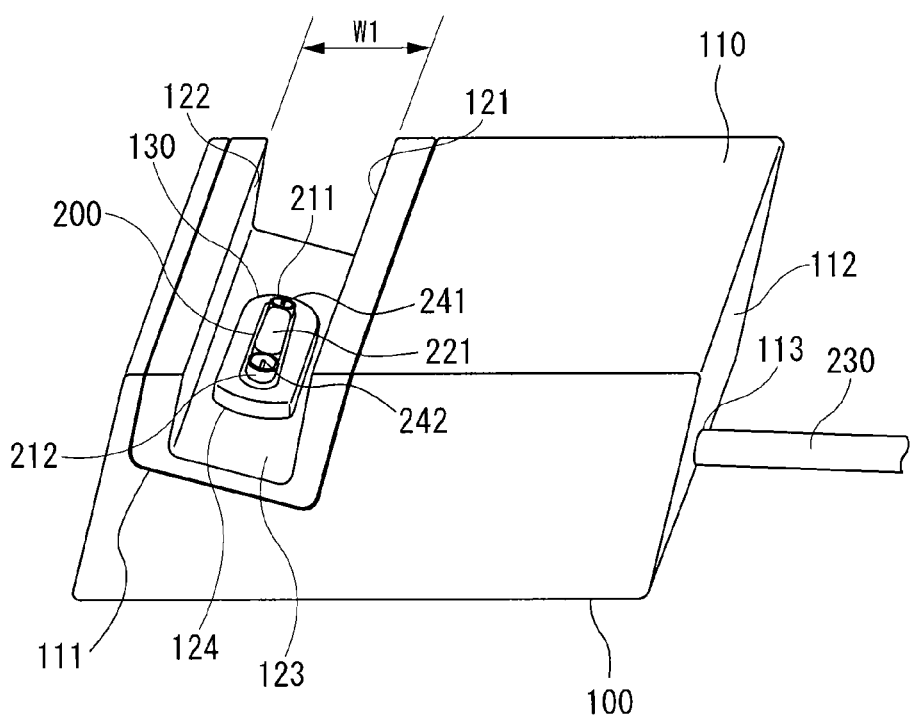
FIG. 3 illustrates the charging stand of FIG. 2 from an alternate viewing angle.

Next, FIG. 2 illustrates a non-limiting example of a charging stand structure, and FIG. 3 provides an alternative viewing angle for the charging stand shown in FIG. 2. Referring first to FIG. 2, the terminal holding member 120 is shown mounted within the groove 111 of a main body 110. The main body 110 and the terminal holding member 120 may, in certain embodiments, be made from a resin material. The terminal holding member 120 includes a wall 121, a wall 122, and a bottom face 123, which are arranged such that a mobile device inserted in the terminal holding member 120 is sandwiched by the respective walls forming the inner periphery of the terminal holding member 120.

Referring now to FIG. 3, an internal width W1 of the terminal holding member 120 is defined for the purposes of this example as the distance from the face of the wall 121 to the opposing face of the wall 122. The internal width W1 may, e.g., correspond to a thickness of a mobile device. That is, the internal width W1 may be substantially the same width as the width from a front face to a rear face of a mobile device such that the mobile device is held within the terminal holding member 120 with sufficient clearance to insert and remove the mobile device in the terminal holding member 120 when charging is performed. An opening 124 is formed in the bottom face 123. The opening 124 may have a shape corresponding to a shape of a movable member 300, which is configured to hold a plug 200. The plug 200 is capable of supplying an electric current for charging an external device, and includes pins 241 and 242, which are respectively surrounded by terminal covers 211 and 212. In certain aspects of the present disclosure, the terminal covers 211 and 212 may be of different shapes. Providing terminal covers of different shapes may, for example, ensure that the mobile device is properly inserted into the charging stand 100 when the mobile device's battery is being charged (e.g., the connector pins 241 and 242 are properly matched to corresponding connections on the mobile device's charging terminal for proper polarity). In certain aspects of the present disclosure, the connector pins 241 and 242 and corresponding terminal covers may be disposed at a predetermined interval with a magnet 221 arranged therebetween. However, this arrangement is not limiting, and the magnet 221 may be positioned elsewhere on the main body 110 or the movable member 130.

The plug 200 may be connected to a cable 230 which extends outward from a hole 113 formed in a back surface 112 of the main body 110. In certain aspects of the present disclosure, the plug 200 and the cable 230 may be removed from the charging stand 100, and other plugs and cables may be routed into the charging stand 100 such that other mobile devices may be charged using the same charging stand. In other aspects of the present disclosure, fixed circuitry may be included within the charging stand 100, and a connection port may be provided in the main body 100 such that an external current may be connected to the charging stand 100 and the mobile device may be charged via the internal circuitry.

Figure 4:
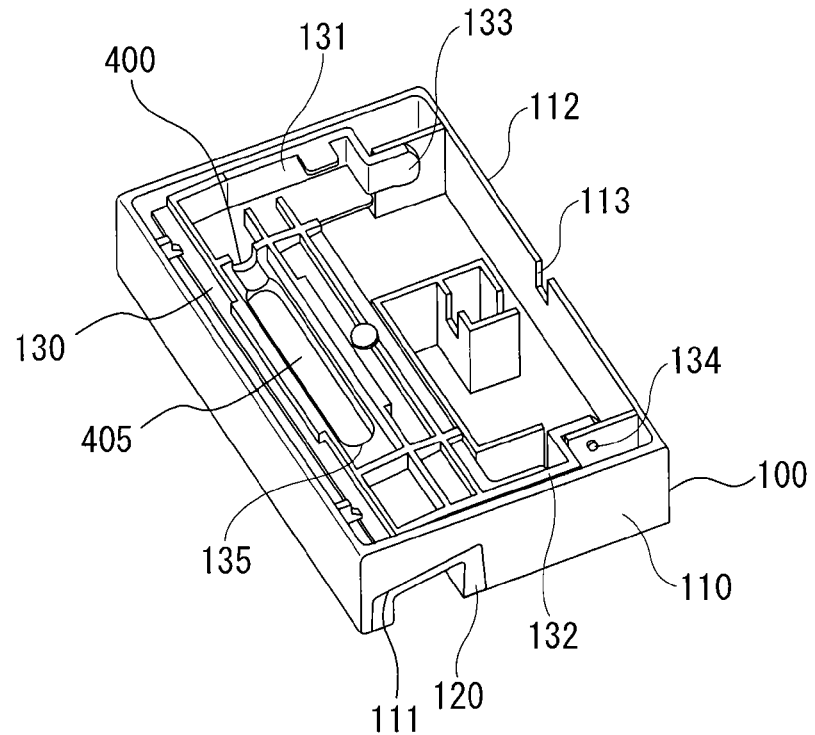
FIG. 4 illustrates an exemplary internal structure of the charging stand of FIG. 2 according to one aspect of the present disclosure.
Figure 5:
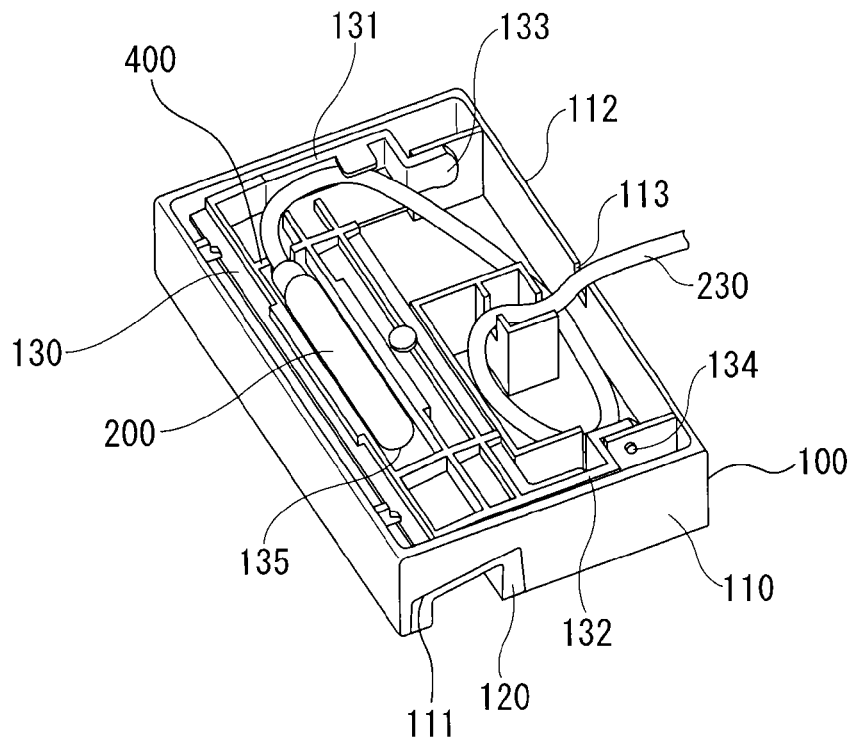
FIG. 5 illustrates an exemplary electrical charging plug installed in the exemplary charging stand of FIG. 4 according to one aspect of the present disclosure.

Next, FIGS. 4 and 5 illustrate a non-limiting example of an internal structure of a charging stand. In particular, FIG. 4 illustrates an example in which the plug 200 and the cable 230 have been removed from the charging stand 100, and FIG. 5 illustrates an example in which the plug 200 and the cable 230 are included within the charging stand 100. It is noted that a cover plate is preferably included on the bottom surface of the charging stand 100 such that the internal structure shown in FIGS. 4 and 5 is not damaged; however, the bottom cover is not shown in FIGS. 4 and 5 for illustration purposes.

Referring now to FIG. 4, FIG. 4 illustrates the movable member 130 within the main body 110. The movable member 130 includes arms 131 and 132, and projection parts 133 and 134. Additionally, the movable member 130 includes a cable guide part 400, which is provided for routing the cable 230 when connecting the plug 200 to an opening 405 provided in the movable member 130. The opening 405 may be in a corresponding location to openings formed in the main body 110 and/or the terminal holding member 120.

In the exemplary structure of FIG. 4, the projection parts 133 and 134 act as fulcrum points from which the arms 131 and 132 may pivot in response to a movement of the movable member 130. For example, an external force may act upon the movable member 130 such that the movable member 130 pivots at the projection parts. In response to the pivoting, the opening 405 moves to and from the bottom face of the groove 111, which moves the plug 200 into and out of the opening formed in the main body 110 and/or the terminal holding member 120.

As a further example of moving the movable member 130, the magnet 221 included in the plug 200 may be attracted to a ferromagnetic material in a mobile device being charged in the charging stand 100, and the resultant magnetic force may draw the movable member 130 and the connected plug 200 upwards such that at least one terminal connector pin of the plug 200 extends beyond the opening formed in the main body 110 and/or the terminal holding member 120. Additionally, when the magnetic attraction between the magnet 221 and the ferromagnetic material in the mobile device falls below a predetermined magnitude, the movable member 130 may move downward such that the one or more terminal connectors of the plug 200 are maintained below the opening 124. Maintaining the connector pins and other portions of the plug 200 below a plane formed over the opening 124 provides the advantage of preventing surface damage to the mobile device when attempting to align the mobile device's charging terminal with the plug 200. That is, maintaining the projecting portions of the plug 200 below the plane formed over the opening 124 prevents any of the projecting parts from scratching the surface of the mobile device when attempting to place the mobile device in the charging stand 100. In certain embodiments of the present disclosure, a tension member such as a spring may be used to maintain the movable member and the connected plug 200 below the plane formed over the opening 124.

Referring now to FIG. 5, a plug holding part 135 is provided such that the plug 200 may be attached to the movable member 130. When an external/detachable charging cord is used in the charging stand 100, the plug 200 may be inserted in the plug holding part 135, and the cord 230 may be routed within the main body 110 via the cable guide part 400 and the hole 113 formed in the back surface 112.

Figure 6:
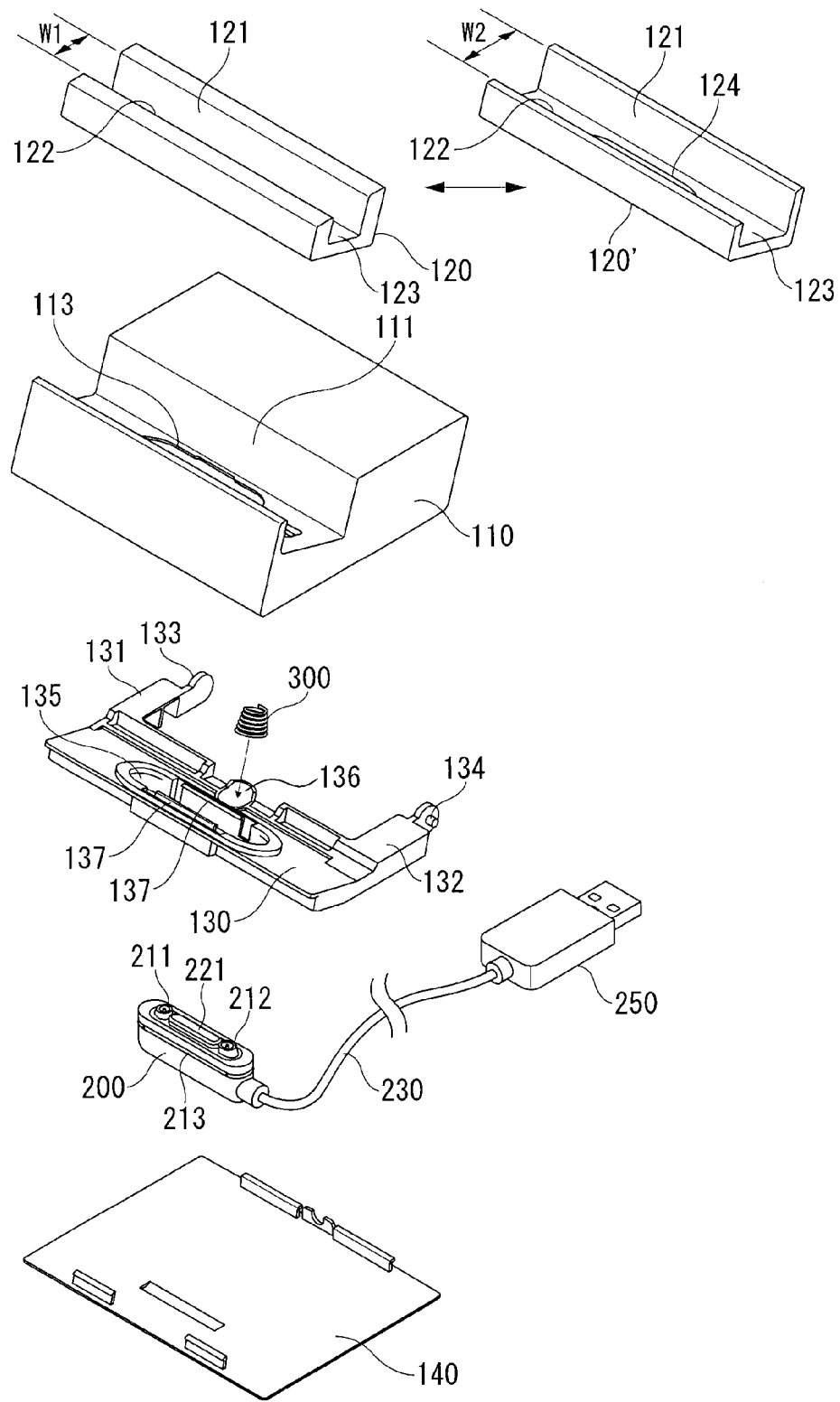
FIG. 6 illustrates a disassembled view of the exemplary charging stand of FIG. 2 according to one aspect of the present disclosure.

Next, FIG. 6 illustrates a disassembled view of an exemplary charging stand according to one aspect of the present disclosure. In addition to the terminal holding member 120, FIG. 6 illustrates a second terminal holding member 120', which has an outer diameter that is substantially the same as the outer diameter of the terminal holding member 120; however, the inner diameter W2 is greater than the inner diameter W1 of the terminal holding member 120, thereby allowing the terminal holding member 120' to accommodate mobile devices of a greater thickness than those able to be accommodated by the terminal holding member 120. Additionally, the terminal holding member 120' is shown having an opening 124, which corresponds to opening 113 formed in the bottom face of the groove 111. The opening 113 and the opening 124 provide a movement channel in which the movable member 130 may traverse the plug 200 upwards and downwards such that the connector pins 211 and 212 may be engaged with an external device during charging.

One or more hooks 137 may be provided in the plug holding part 135 such that the plug 200 is secured in the movable member 130. Corresponding notches 213 may be provided in the plug 200 for engaging the hooks 137.

FIG. 6 also shows a tension member 300 that may be affixed to a tension member holding part 136. In certain aspects of the present disclosure, the tension member 300 may be connected to the main body 110 at one end, and connected at another end to the movable member 130 such that the movable member 130 is maintained in a state in which the terminals of the plug 200 are maintained below a plane formed over the opening 113 and/or the opening 124 when a mobile device is not being charged (e.g., when the mobile device is not within a predetermined distance from the charging stand and/or in a predetermined alignment position with the charging stand). For example, when the magnet 221 arranged in the plug 200 is not in the presence of a magnetic field of sufficient strength to overcome the force provided by the tension member 300, the movable member 130 is maintained in a state in which the arms 131 and 132 pivot downward via the projection parts 133 and 134 such that the plug is maintained below the opening 113 and/or the opening 124. Alternatively, when a material such as a metallic plate located, e.g., in a charging terminal of the mobile device, is brought within a predetermined distance of the magnet 221, the magnetic attraction between the metallic plate of the mobile device and the magnet 221 of the plug 200 may be sufficient to overcome the elastic force provided by the tension member 300 such that the arms 131 and 132 pivot upward from projection parts 133 and 134. In response to the movement, the terminals of the plug 200 extend beyond the opening 113 and/or the opening 124 such that the mobile device's charging terminal may engage the plug 200 and charging may commence. It should be appreciated that while the magnet 221 is shown in the present example as being arranged in the plug 200, the skilled artisan will easily appreciate that magnets may be arranged elsewhere within the charging stand to provide the advantages discussed herein. For example, a magnet may be disposed on the movable member 130.

A charger connecting plug 250 is shown connected to the plug 200 via the cable 230. The charging connecting plug 250 may connect with an external power source for providing an electrical current to charge an external device. The charger connecting plug 250 may, for example, be a Universal Serial Bus (USB) type connector, or other suitable connector for providing an electrical charge to a mobile device or other external device.

Bottom cover plate 140 provides a protective covering when affixed to the main body 110.

Figure 7A:
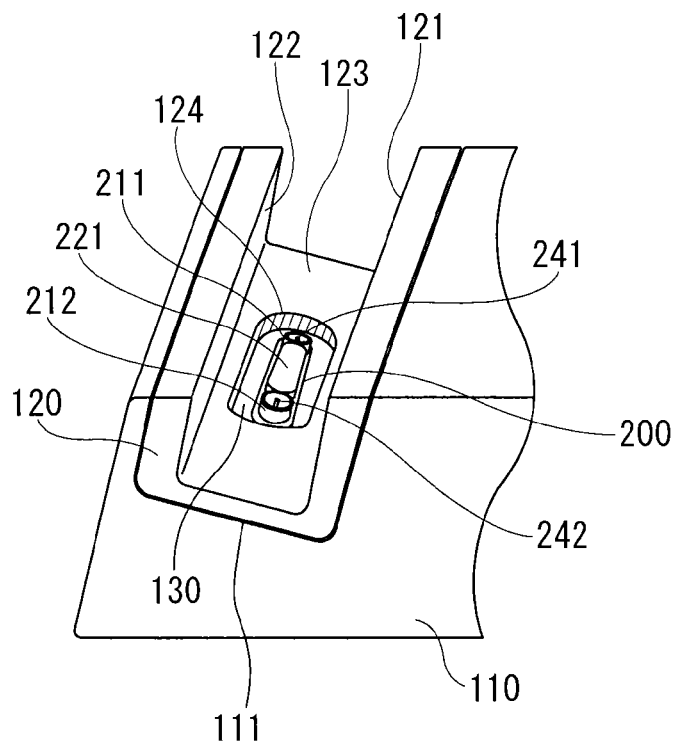
FIGS. 7A and 7B illustrate an example of an exemplary moveable member transitioning states according to one aspect of the present disclosure.
Figure 7B:
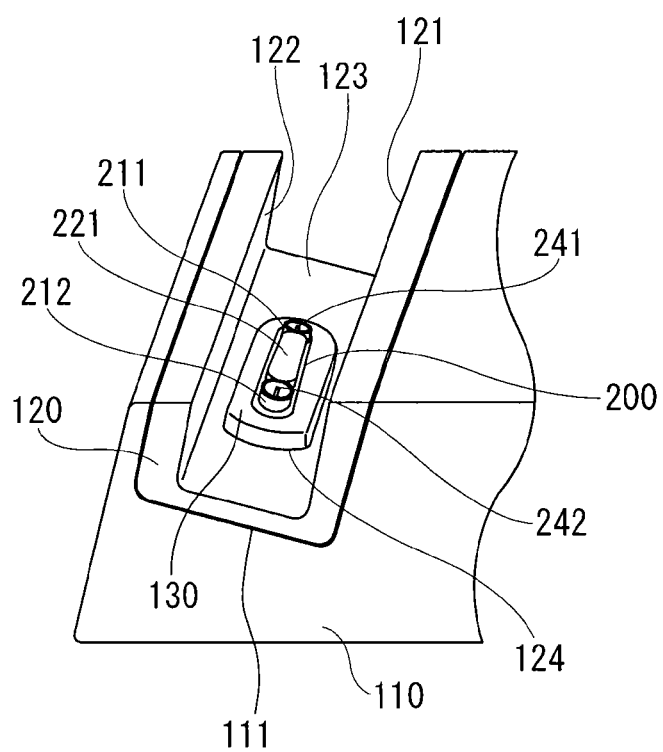

Next, FIGS. 7A and 7B illustrate a non-limiting example of a charging stand movable member transitioning states. Referring first to FIG. 7A, FIG. 7A illustrates the plug 200 held by the movable member 130. The movable member 130 is illustrated in this example as being lowered within the opening 124 such that the connector pins 241 and 242 are below a plane formed over the opening 124. In certain aspects of the present disclosure, the tension member 300 may provide a force for moving the movable member 130 downward and maintaining the movable member in the exemplary state shown in FIG. 7A. For example, the tension member 300 may be connected at one end to the movable member 130 and at another end to the main body 110, and the tension member 300 may force the movable member 130 to pivot downward via the projection parts 133 and 134. In other aspects of the present disclosure, the tension member may be excluded such that the movable member 130 moves freely. In this case, the movable member 130 remains in the down state when the charging stand 100 is in the upright position, and the movable member 130 may transition to an upward state due to the previously discussed magnetic force.

As discussed previously, the state of the charging stand illustrated in the non-limiting example of FIG. 7A provides the advantage of preventing damage to a mobile device when attempting to align the mobile device's charging terminal with the connector pins of the plug 200.

Referring now to FIG. 7B, FIG. 7B illustrates an example in which a mobile device has been arranged within the terminal holding member 120 such that the mobile device's charging terminal is engaged with the plug 200. While the example illustrated in FIG. 7B assumes that the plug 200 is engaged with a mobile device charging terminal, the mobile device has been omitted from the figure for illustration purposes. According to the non-limiting example of FIG. 7B, the magnet 221 arranged in the plug 200 experiences a magnetic attraction to a ferromagnetic material included in the mobile device. In certain aspects of the present disclosure, the magnetic force resulting from the attraction experienced by the magnet 221 may be sufficient to overcome the elastic force exerted by the tension member 300 when a first point of the charging stand 100 is substantially aligned with a second point included on the mobile device. The magnet 221 and the tension member 300 are preferably designed such that the movable member 130 transitions to the state shown in FIG. 7B when the mobile device's charging terminal is substantially aligned with the terminals of the plug 200. That is, it is undesirable for the movable member 130 to remain in the state shown in FIG. 7B unless the mobile device being charged is moved within a predetermined range of the magnet 221 (or in a particular alignment position) because transitioning the movable member 130 to the station in FIG. 7B may unnecessarily cause damage to the mobile device. Those of ordinary skill will easily appreciate that sufficient thresholds should be incorporated into the design such that user error when attempting to align the mobile device with the plug 200 is mitigated. It is also noted that while the preferred embodiment includes the tension member 300 for providing an elastic force for maintaining the movable member 130 in the state illustrated in FIG. 7A, the advantages described herein with respect to preventing damage to a mobile device may be accomplished without using a tension member. For example, the movable member 130 may be permitted to pivot downwards via gravity when the magnet 221 is not influenced by a magnetic attraction between the mobile device and the magnet.

Figure 8A:
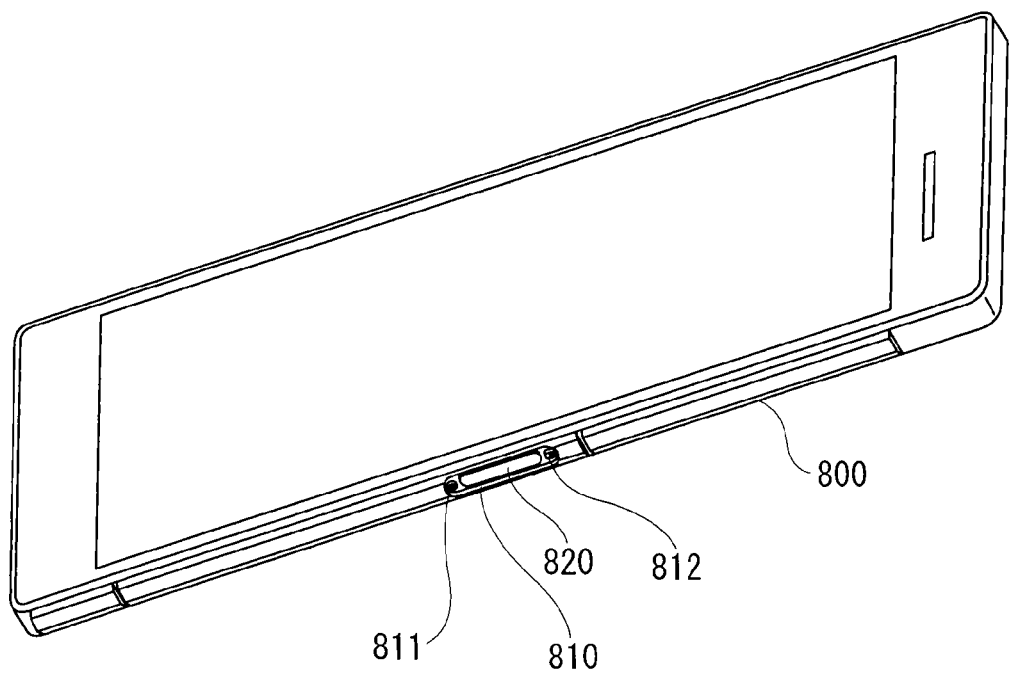
FIGS. 8A and 8B illustrate an exemplary charging terminal provided on a mobile device according to one aspect of the present disclosure.
Figure 8B:
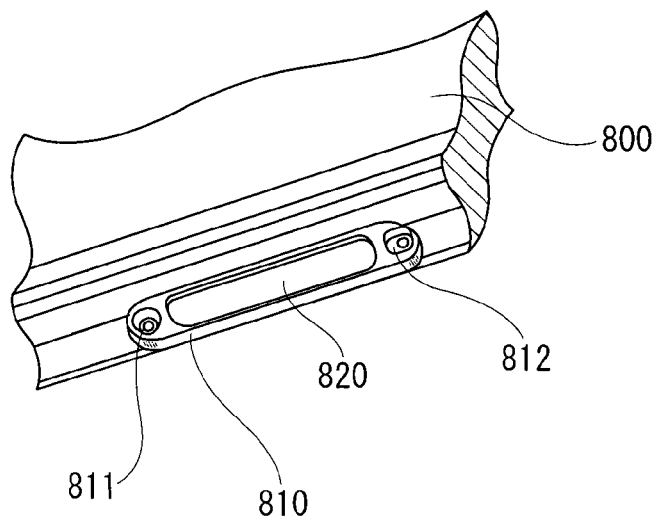

Next, FIGS. 8A and 8B illustrate a non-limiting example in which a charging terminal 810 is provided on the mobile device 800. Referring first to FIG. 8A, the charging terminal 810 is disposed on a peripheral edge of the terminal device 800 such that the mobile device 800 may be engaged in the charging stand 100 (e.g., as in the case of FIGS. 1A and 1B).

Referring now to FIG. 8B, FIG. 8B illustrates a close-up view of the charging terminal 810. Terminal connections 811 and 812 are included in the charging terminal 810. The terminal connections 811 and 812 may, for example, correspond to the connector pins 241 and 242 included in the plug 200. In certain aspects of the present disclosure, the terminal connections 811 and 812 may be of different shapes (e.g., corresponding shapes to the charging stand terminal connections). Additionally the terminal connections 811 and 812 may include a protective resin cover. A plate 820 is disposed between the terminal connections 811 and 812. The plate 820 may be comprised of a ferromagnetic material such that a magnetic attraction may be created between the plate 820 and the magnet 221. While the plate 820 is illustrated being centered between the terminal connections 811 and 812, this arrangement is not limiting. For example, the plate 820 may be arranged elsewhere on the mobile device 800 external surface, or may be internal to the mobile device 800.

Figure 9A:
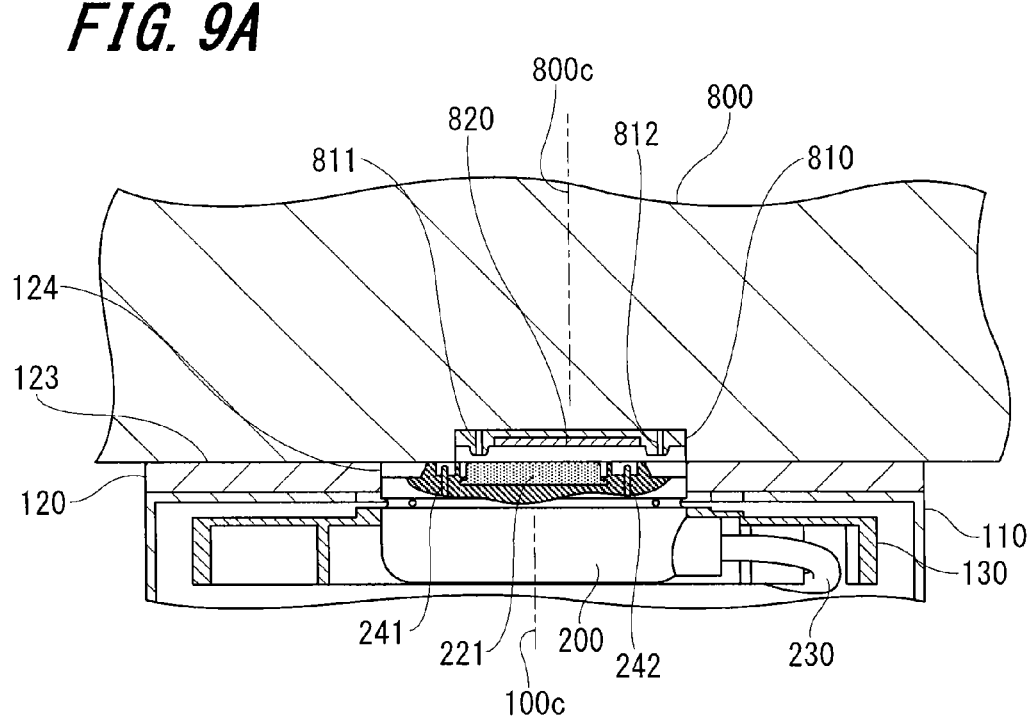
FIGS. 9A and 9B illustrate an exemplary cross-sectional view of a charging device supplying an electrical current to a mobile device according to one aspect of the present disclosure.
Figure 9B:
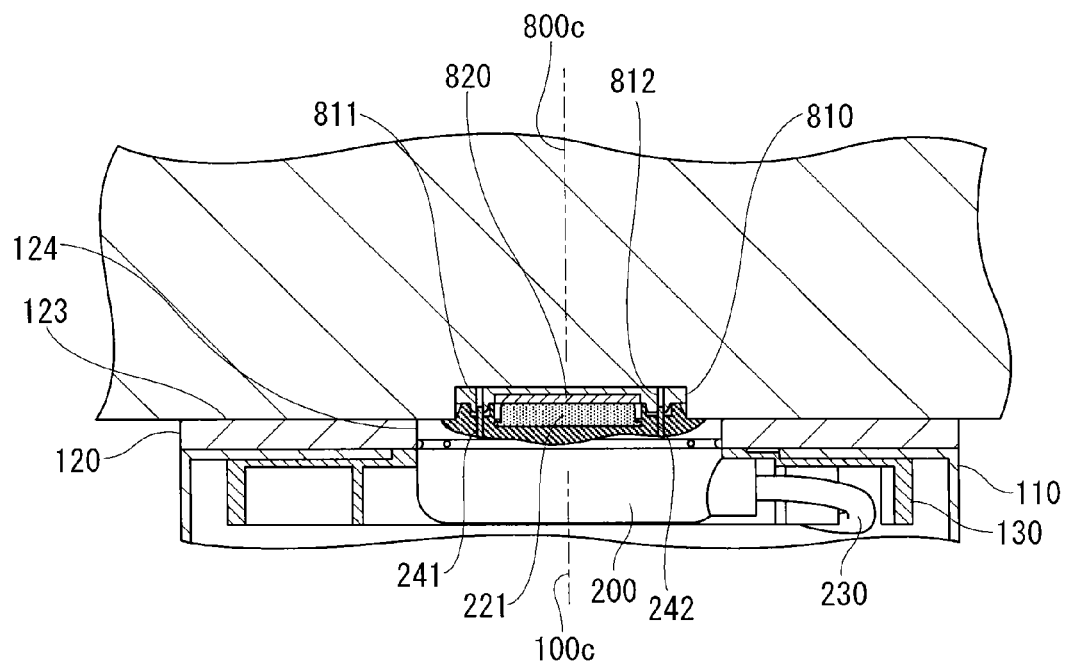

Next, FIGS. 9A and 9B illustrate a cross-sectional view showing a non-limiting example of mounting the mobile device 800 in the charging stand 100. Referring first to FIG. 9A, FIG. 9A illustrates a center line 800c, which corresponds to a substantially center portion of the mobile device 800 charging terminal. In certain aspects of the present disclosure, the center line 800c may correspond to a center point on the plate 820. A center line 100c is shown corresponding to a substantially center portion of the magnet 221.

In the non-limiting example of FIG. 9A, the center line 800c is offset from the center line 100c, thereby resulting in a magnetic attraction less than a predetermined magnitude for moving the plug 200 upward through the bottom face 123. Since the movable member 130 and the plug 200 remain below the bottom face 123 of the terminal holding member 120, the connector pins 241 and 242 do not engage the corresponding terminal connections 811 and 812, and the mobile device 800 is not charged. Additionally, the connector pins 241 and 242 do not project above the bottom face 123, which prevents damaging the mobile device 800 external surface.

Referring now to FIG. 9B, FIG. 9B illustrates the center line 800c and the center line 100c substantially aligned (i.e., within a predetermined tolerance). When the center line 800c and the center line 100c are aligned within the predetermined tolerance, the magnetic attraction between the magnet 221 and the plate 820 draws the movable member 130 upward, which results in the pins 241 and 242 of the plug 200 engaging the charging terminal 810 of the mobile device 800. The predetermined tolerance at which the movable member 130 traverses upwards to engage with the charging terminal 810 may, in certain aspects of the present disclosure, correspond to at least a minimum magnetic force required to overcome the elastic force exerted by the tension member 300 on the movable member 130. In other aspects of the present disclosure, the predetermined tolerance may be determined based on the mobile device 800 being within a predetermined range of the magnet 221. In other aspects of the present disclosure, the predetermined tolerance may be based on the arrangement features of the charging terminal 110 (e.g., the dimensions of the charging terminal 810, the position of the plate 820, the positions of the terminal connections, the amount of protective coating surrounding the charging terminal, etc.). In other aspects of the present disclosure, the predetermined tolerance may be based on a spring constant of the tension member 300, and the spring constant may correspond to a minimum magnetic force capable of moving the movable member 130 upward such that the plug 200 can engage the mobile device.

Figure 10A:
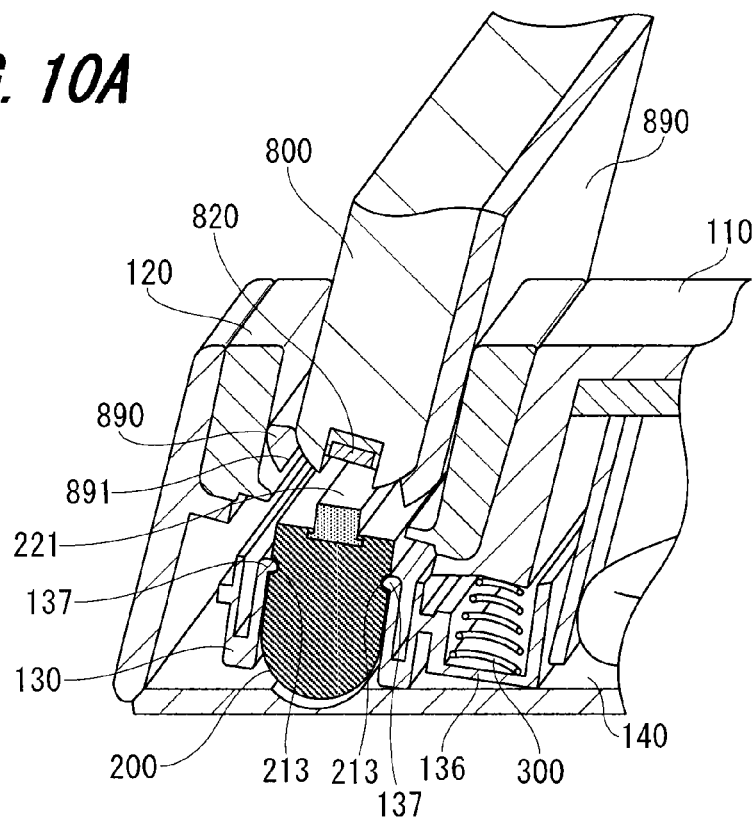
FIGS. 10A and 10B illustrate another exemplary cross-sectional view of a charging device supplying an electrical current to a mobile device according to one aspect of the present disclosure.
Figure 10B:
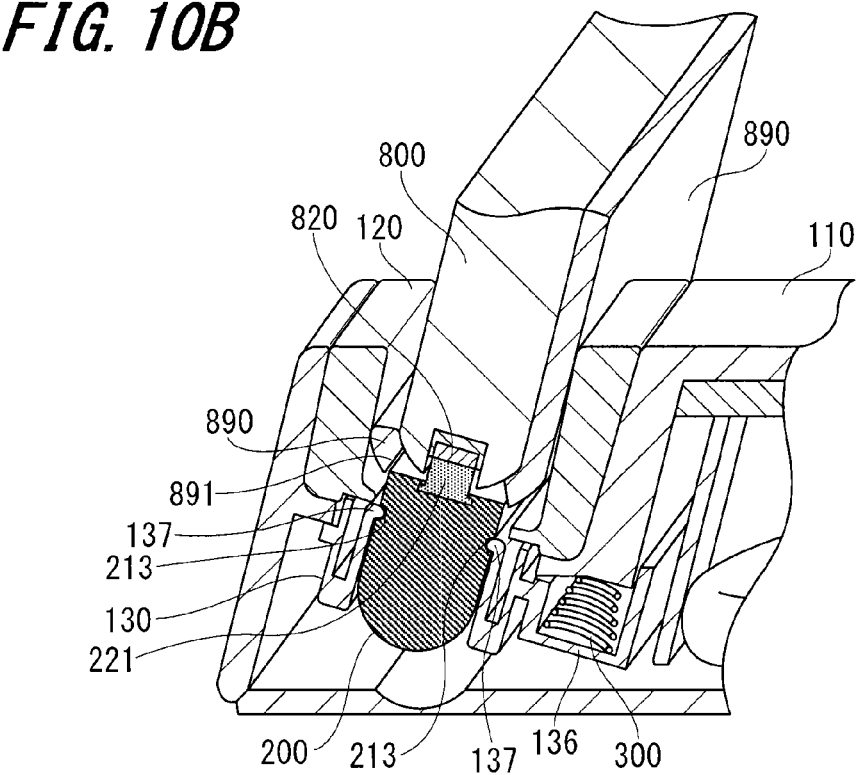

Next, FIGS. 10A and 10B illustrate another exemplary cross-sectional view of a charging stand supplying electrical current to a mobile device according to another aspect of the present disclosure. In particular, FIGS. 10A and 10B illustrate a non-limiting example of the magnet 221 contacting the plate 820 such that the respective mobile device and charging stand terminals engage, thereby supplying an electrical charging current from the charging stand 100 to the mobile device 800.

Referring first to FIG. 10A, the mobile device 800 includes a cover 890 arranged on a side surface and a back surface of the mobile device 800. The cover 890 includes an opening 891, which is arranged in a corresponding position to the terminal 810. The cover 890 may, for example, be provided for protection of the mobile device 800; however, the cover 890 should not impede the magnet 221 from contacting the plate 820 when the mobile device 800 is engaged in the main body 110. As discussed previously, the terminal holding member 120 may, in certain aspects of the present disclosure, be detachable from the main body 110 such that other terminal holding members of varied internal widths may be attached to the main body 110. Thus, the charging stand 100 according to the example shown in FIG. 10A may include a terminal holding member with an internal width corresponding to a thickness of the mobile device 800 plus the thickness of the cover 890. Additionally, the movement of the movable member 130 may be controlled such that the plug 200 is engagable with a corresponding external device charging terminal when the terminal holding member 120 and/or the cover 890 are used.

FIG. 10A illustrates a state in which the mobile device 800 is brought within the groove formed in the terminal holding member 120; however, the mobile device 800 is not aligned in such a way that the movable member 130 transitions upward in response to a magnetic attraction between the magnet 221 and the plate 820. Therefore, the movable member 130 remains in a state in which the plug 200 is maintained below the opening formed in the main body 110 and/or the terminal holding member 120. In certain aspects of the present disclosure, the tension member 300 may maintain the movable member 130 in the state in which the plug 200 remains below the opening in the terminal holding member and/or the main body.

The example of FIG. 10B illustrates a case in which the mobile device 800 is contacting a bottom face of the terminal holding member 120 such that the plug 200, which includes the magnet 221, moves upward through the opening formed in the main body 110 and the terminal holding 120. In certain aspects of the present disclosure, the magnet 221 and/or the plate 820 may be chosen and/or arranged such that the magnetic force required to overcome the elastic force of the tension member 300 is achieved by aligning a point on the mobile device 800 with a second point on the charging stand 100. For example, the movable member 130 may transition upward such that the magnet 221 contacts the plate 820 when a center line of the magnet 221 is substantially aligned with a center line of the plate 820. In response to the moveable member 130 transitioning to the state shown in the example of FIG. 10B, an electrical current is passed from the plug 200 housed within the main body 110 to the terminals 811 and 812 included in the mobile device 800.

Figure 11:
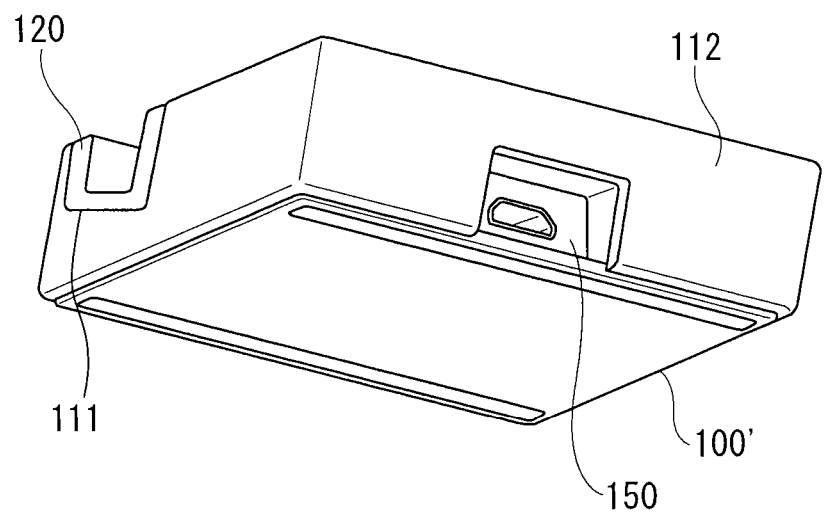
FIG. 11 illustrates an exemplary charging device structure including a terminal for an external charging connection.

Next, FIG. 11 illustrates an alternative embodiment of the charging stand 100 according to another aspect of the present disclosure. In particular, FIG. 11 illustrates a charging stand 100', which includes a terminal 150 arranged at the back surface 112. In certain aspects of the present disclosure, the terminal 150 may be electrically connected to internal circuitry for charging an external device via the charging stand 100'. For example, the terminal 150 may be electrically connected to a circuit board and/or a charging plug such as the plug 200. In this case, the charging circuitry of the charging stand 100' may have a terminal that may be attached to the movable member 130. It should be appreciated that while the terminal 150 shown in the non-limiting example of FIG. 11 is permanently fixed to the charging stand 100', charging circuitry housed within the charging stand 100' is not necessarily fixed, and in certain aspects of the present disclosure may be removed from the charging stand 100' such that other types of circuitry connections may be made with other types of mobile devices.

Obviously, numerous modifications and variations of the present disclosure are possible in light of the above teachings. It is therefore to be understood that within the scope of the appended claims, the invention may be practiced otherwise than as specifically described herein. For example, advantageous results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable processing circuits configured to execute program code and/or computer instructions to execute the functions, processes and algorithms described herein. A processing circuit includes a programmed processor, as a processor includes circuitry. A processing circuit also includes devices such as an application specific integrated circuit (ASIC) and conventional circuit components arranged to perform the recited functions. Additionally, some implementations may be performed on modules or hardware not identical to those described. Accordingly, other implementations are within the scope that may be claimed.

It must be noted that, as used in the specification and the appended claims, the singular forms "a," "an," and "the" include plural referents unless the context clearly dictates otherwise.

The above disclosure also encompasses the embodiments noted below.

(1) An apparatus comprising: a main body having an opening; and a movable member configured to hold a plug capable of transmitting an electrical current to an external device, wherein at least one of the movable member and the plug include a magnet, the movable member and the plug are arranged such that at least one terminal connector of the plug extends beyond a plane parallel to the opening when the movable member is in a first state, the movable member is in the first state when a magnetic force between a ferromagnetic material and the magnet is greater than a predetermined magnitude, which causes the movable member to move such that the at least one terminal connector is engagable with a corresponding charging terminal of an external device, the movable member transitions from the first state to a second state when the magnetic force is below the predetermined magnitude, and when the movable member is in the second state, the at least one terminal connector of the plug remains below the plane parallel to the opening.

(2) The apparatus of (1), further comprising a tension member connected at one end to the main body and connected at another end to the movable member.

(3) The apparatus of (1) or (2), wherein the tension member maintains the moveable member in the second state until the magnetic force is greater than the predetermined magnitude.

(4) The apparatus of any one of (1) to (3), wherein: the tension member is a spring, and the spring has a spring constant corresponding to a magnetic force capable of moving the movable member from the second state to the first state when a centerline of the magnet is aligned with a centerline of the ferromagnetic material.

(5) The apparatus of any one of (1) to (4), wherein: the main body includes a groove, and the opening of the main body is disposed in the groove.

(6) The apparatus of any one of (1) to (5), further comprising a holding member disposed in the groove, wherein the holding member includes an opening that is aligned with the opening of the main body when the holding member is engaged in the groove, and the movable member is configured such that the at least one terminal connector of the plug extends beyond a plane over the opening in the holding member when the movable member is in the first state.

(7) The apparatus of any one of (1) to (6), wherein the holding member includes a u-shaped groove having an internal width corresponding to a thickness of the external device.

(8) The apparatus of any one of (1) to (7), wherein the main body is configured to accept a plurality of detachable holding members having varied internal widths.

(9) The apparatus of any one of (1) to (8), wherein the moveable member is configured such that the plug may be detached and other plugs may be connected to the moveable member.

(10) A method of providing an electrical charging current to an external device via a charging apparatus, whereby the external device includes a ferromagnetic material, the method comprising: moving the external device within a predetermined distance of the charging apparatus such that a magnetic attraction develops between the ferromagnetic material and a magnet included in at least one of a movable member disposed on the charging apparatus and an electrical charging plug held by the movable member; and aligning a first point of the external device with a second point of the charging apparatus such that the movable member is in a first state, wherein the movable member is in the first state when the magnetic attraction between the ferromagnetic material and the magnet is greater than a predetermined magnitude, which causes the movable member to move such that at the least one terminal connector of the plug is engagable with a corresponding charging terminal of the external device, when the first point and the second point are out of alignment, the movable member is in a second state, the second state being a condition in which the at least one terminal connector of the plug remains below a plane parallel to the opening.

(11) The method of (10), wherein the charging apparatus includes a tension member connected at one end to the main body and connected at another end to the movable member.

(12) The method of (10) or (11), wherein the tension member maintains the moveable member in the second state when the first point and the second point are out of alignment.

(13) The method of any one of (10) to (12), wherein: the tension member is a spring, and the spring has a spring constant corresponding to a magnetic force capable of moving the movable member from the second state to the first state when the first and second point are aligned.

(14) The method of any one of (10) to (13), wherein: the main body includes a groove, and the opening of the main body is disposed in the groove.

(15) The method of any one of (10) to (14), wherein: a holding member is disposed in the groove, the holding member includes an opening that is aligned with the opening of the main body when the holding member is engaged in the groove, and the movable member is configured such that the at least one terminal connector of the plug extends beyond a plane over the opening in the holding member when the movable member is in the first state.

(16) The method of any one of (10) to (15), wherein the holding member includes a u-shaped groove having an internal width corresponding to a thickness of the external device.

(17) The method of any one of (10) to (16), wherein the main body is configured to accept a plurality of detachable holding members having varied internal widths corresponding to thicknesses of other external devices.

(18) The method of any one of (10) to (17), wherein the moveable member is configured such that the plug may be detached and other plugs may be connected to the moveable member.

(19) The method of any one of (10) to (18), wherein the groove in the main body is open at each end such that a periphery of the external device may extend outside the main body when the external device is engaged in the groove.

(20) A battery charging stand comprising: a main body having a groove configured to sandwich an external device; a movable member configured to hold a plug capable of transmitting an electrical current to an external device, wherein the plug is arranged in an opening formed in the groove and a movement of the movable member results in the plug moving through the opening; and a magnet attached to at least one of the plug or the movable member, wherein when the external device is engaged in the groove, an attraction between the magnet and the external device results in the movable member being in a first state, the first state being a condition where the attraction causes the moveable member to move such that at least one terminal connector of the plug extends beyond a plane parallel to the opening, when the external device is disengaged from the groove, the movable member transitions from the first state to a second state, the second state corresponding to a condition where the at least one terminal connector of the plug remains below the plane parallel to the opening.

The invention claimed is:

1. An apparatus comprising:
a main body having an opening; and
a movable member configured to hold a plug capable of transmitting an electrical current to an external device, wherein
at least one of the movable member and the plug includes a magnet,
the movable member and the plug are arranged such that at least one terminal connector of the plug extends beyond a plane formed over the opening when the movable member is in a first state,
the movable member is in the first state when a magnetic force between a ferromagnetic material and the magnet is greater than a predetermined magnitude, which causes the movable member to move such that the at least one terminal connector is engagable with a corresponding charging terminal of the external device,
the movable member transitions from the first state to a second state when the magnetic force is below the predetermined magnitude, and
when the movable member is in the second state, the at least one terminal connector of the plug is lowered below the plane formed over the opening.

2. The apparatus of claim 1, further comprising
a tension member connected at one end to the main body and connected at another end to the movable member.

3. The apparatus of claim 2, wherein
the tension member maintains the movable member in the second state until the magnetic force is greater than the predetermined magnitude.

4. The apparatus of claim 3, wherein:
the tension member is a spring, and
the spring has a spring constant corresponding to a magnetic force capable of moving the movable member from the second state to the first state when a centerline of the magnet is aligned with a centerline of the ferromagnetic material.

5. The apparatus of claim 1, wherein:
the main body includes a groove, and
the opening of the main body is disposed in the groove.

6. The apparatus of claim 5, further comprising
a holding member disposed in the groove, wherein
the holding member includes an opening that is aligned with the opening of the main body when the holding member is engaged in the groove, and
the movable member is configured such that the at least one terminal connector of the plug extends beyond the plane formed over the opening in the holding member when the movable member is in the first state.

7. The apparatus of claim 6, wherein
the holding member includes a u-shaped groove having an internal width corresponding to a thickness of the external device.

8. The apparatus of claim 7, wherein
the main body is configured to accept a plurality of detachable holding members having varied internal widths.

9. The apparatus of claim 1, wherein
the movable member is configured such that the plug may be detached and other plugs may be connected to the movable member.

10. A method of providing an electrical charging current to an external device via a charging apparatus, whereby the external device includes a ferromagnetic material, the method comprising:
moving the external device within a predetermined distance of the charging apparatus such that a magnetic attraction develops between the ferromagnetic material and a magnet included in at least one of a movable member disposed on the charging apparatus and an electrical charging plug held by the movable member; and
aligning a first point of the external device with a second point of the charging apparatus such that the movable member is in a first state, wherein
the movable member is in the first state when the magnetic attraction between the ferromagnetic material and the magnet is greater than a predetermined magnitude, which causes the movable member to move such that at least one terminal connector of the electrical charging plug extends beyond a plane formed over an opening of a main body of the charging apparatus and is engagable with a corresponding charging terminal of the external device, and
when the first point and the second point are out of alignment, the movable member is in a second state, the second state being a condition in which the at least one terminal connector of the electrical charging plug is lowered below the plane formed over the opening of the main body of the charging apparatus.

11. The method of claim 10, wherein
the charging apparatus includes a tension member connected at one end to the main body and connected at another end to the movable member.

12. The method of claim 11, wherein
the tension member maintains the movable member in the second state when the first point and the second point are out of alignment.

13. The method of claim 12, wherein:
the tension member is a spring, and
the spring has a spring constant corresponding to a magnetic force capable of moving the movable member from the second state to the first state when the first and second points are aligned.

14. The method of claim 10, wherein:
the main body includes a groove, and
the opening of the main body is disposed in the groove.

15. The method of claim 14, wherein:
a holding member is disposed in the groove,
the holding member includes an opening that is aligned with the opening of the main body when the holding member is engaged in the groove, and
the movable member is configured such that the at least one terminal connector of the electrical charging plug extends beyond the plane formed over the opening in the holding member when the movable member is in the first state.

16. The method of claim 15, wherein
the holding member includes a u-shaped groove having an internal width corresponding to a thickness of the external device.

17. The method of claim 16, wherein
the main body is configured to accept a plurality of detachable holding members having varied internal widths corresponding to thicknesses of other external devices.

18. The method of claim 17, wherein
the movable member is configured such that the electrical charging plug may be detached and other electrical charging plugs may be connected to the movable member.

19. The method of claim 14, wherein
the groove in the main body is open at each end such that a periphery of the external device may extend outside the main body when the external device is engaged in the groove.

20. A battery charging stand comprising:
a main body having a groove configured to sandwich an external device;
a movable member configured to hold a plug capable of transmitting an electrical current to the external device, wherein the plug is arranged in an opening formed in the groove and a movement of the movable member results in the plug moving through the opening; and
a magnet attached to at least one of the plug or the movable member, wherein
when the external device is engaged in the groove, an attraction between the magnet and the external device results in the movable member being in a first state, the first state being a condition where the attraction causes the movable member to move such that at least one terminal connector of the plug extends beyond a plane formed over the opening, and
when the external device is disengaged from the groove, the movable member transitions from the first state to a second state, the second state corresponding to a condition where the at least one terminal connector of the plug is lowered below the plane formed over the opening.

* * * * *